US010762040B2

(12) United States Patent
Oliver et al.

(10) Patent No.: US 10,762,040 B2
(45) Date of Patent: Sep. 1, 2020

(54) SCHEMATIZED DATA ROAMING

(71) Applicant: Microsoft Technology Licensing, LLC, Redmond, WA (US)

(72) Inventors: Daniel Jordan Oliver, Seattle, WA (US); Anshul Rawat, Kirkland, WA (US); Kenneth Martin Tubbs, Issaquah, WA (US); Charles Aaron Hare, Woodinville, WA (US); Sriram Srinivasan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 15/414,392

(22) Filed: Jan. 24, 2017

(65) Prior Publication Data

US 2018/0210891 A1 Jul. 26, 2018

(51) Int. Cl.
*G06F 16/00* (2019.01)
*G06F 16/11* (2019.01)
*H04L 29/08* (2006.01)
*G06F 16/22* (2019.01)
*G06F 16/23* (2019.01)

(52) U.S. Cl.
CPC .......... *G06F 16/122* (2019.01); *G06F 16/22* (2019.01); *G06F 16/2365* (2019.01); *H04L 67/10* (2013.01); *H04L 67/306* (2013.01)

(58) Field of Classification Search
CPC ...... G06F 9/4455; G06F 9/4488; G06F 16/22; G06F 16/122; G06F 16/2365; H04L 67/10; H04L 67/306

USPC .......................................... 707/705; 719/332
See application file for complete search history.

(56) References Cited

U.S. PATENT DOCUMENTS

| 7,263,551 | B2* | 8/2007 | Belfiore | G06F 9/54 |
| | | | | 709/219 |
| 7,669,177 | B2* | 2/2010 | Gerber | G06F 9/44505 |
| | | | | 717/100 |
| 8,015,570 | B2* | 9/2011 | Venkatraman | G06F 16/10 |
| | | | | 719/316 |
| 8,195,711 | B2* | 6/2012 | Grossman | G06F 16/252 |
| | | | | 707/802 |

(Continued)

OTHER PUBLICATIONS

Optimizing Data Analysis with a Semi-structured Time Series Database, Bitincka et al., (Year: 2010).*

(Continued)

*Primary Examiner* — Jean M Corrielus

(57) ABSTRACT

Schematized data roaming is described herein. In one or more implementations, a cloud service includes a cloud data store that is configured to store schematized data comprising user preferences and settings of client devices associated with a user profile. The schematized data includes a schema that is shared across the client devices and globally defined by the cloud service which enables the user preferences and setting to be re-used across multiple devices and device classes, including devices that the user has not previously interacted with before. The schematized data includes attributes, for each schematized data structure, which provide rules for processing or storing the corresponding schematized data structure in the cloud data store. Such attributes may include a conflict resolution policy, an upload policy, or a partition policy.

20 Claims, 9 Drawing Sheets

(56) References Cited

U.S. PATENT DOCUMENTS

| | | | |
|---|---|---|---|
| 8,341,193 B2* | 12/2012 | Jones | G06F 16/258 |
| | | | 707/803 |
| 8,843,603 B1 | 9/2014 | Liu et al. | |
| 9,336,060 B2* | 5/2016 | Nori | H04L 41/0806 |
| 9,811,580 B2* | 11/2017 | Adayilamuriyil | G06F 16/284 |
| 9,811,581 B2* | 11/2017 | Adayilamuriyil | G06F 16/284 |
| 2002/0135613 A1 | 9/2002 | O'Hara | |
| 2005/0091184 A1* | 4/2005 | Seshadri | G06Q 10/06 |
| 2005/0091269 A1* | 4/2005 | Gerber | G06F 9/44505 |
| 2005/0091674 A1* | 4/2005 | Knight | G06F 9/4488 |
| | | | 719/332 |
| 2005/0097618 A1 | 5/2005 | Arling et al. | |
| 2011/0154212 A1 | 6/2011 | Gharpure et al. | |
| 2011/0179367 A1* | 7/2011 | Grossman | G06F 16/252 |
| | | | 715/767 |
| 2012/0174212 A1 | 7/2012 | Dart et al. | |
| 2013/0024388 A1* | 1/2013 | Kolb | G06F 17/2247 |
| | | | 705/317 |
| 2013/0169546 A1 | 7/2013 | Thomas et al. | |
| 2014/0201145 A1* | 7/2014 | Dorman | G06F 16/27 |
| | | | 707/634 |
| 2014/0253467 A1 | 9/2014 | Hicks et al. | |
| 2014/0304326 A1* | 10/2014 | Wesley | H04L 67/10 |
| | | | 709/203 |
| 2015/0026125 A1 | 1/2015 | Sharma | |
| 2015/0067099 A1 | 3/2015 | Martin | |
| 2015/0106375 A1* | 4/2015 | Adayilamuriyil | G06F 16/284 |
| | | | 707/737 |
| 2015/0106407 A1* | 4/2015 | Adayilamuriyil | G06F 16/284 |
| | | | 707/804 |
| 2017/0344649 A1* | 11/2017 | Vinnakota | G06F 16/9535 |

OTHER PUBLICATIONS

Named Data Networking of Things (Invited Paper), Shang et al., IEEE (Year: 2015).*

"The Chromium Projects", https://www.chromium.org/chromium-os/chromiumos-design-docs/user-accounts-and-management, Dec. 23, 2010, 4 pages.

Siddi, Francesco, "Introducing Blender Sync", https://cloud.blender.org/blog/introducing-blender-sync, Jun. 30, 2016, 7 pages.

"Wacom", https://cloud.wacom.com/web/index.html, 2013, 2 pages.

"Storing Preferences in iCloud", https://developer.apple.com/library/content/documentation/Cocoa/Conceptual/UserDefaults/StoringPreferenceDatainiCloud/StoringPreferenceDatainiCloud.html, Oct. 22, 2013, 4 pages.

* cited by examiner

SCHEMATIZED DATA ROAMING

BACKGROUND

Today, users interact with a variety of different devices, such as a smartphone, a desktop computer, a laptop computer, a tablet device, a virtual reality device, a gaming system, and a vehicle computing system. As such, users spend a great deal of time configuring each of these different types of devices with various user preferences and settings. When a new device is purchased, the new device feels unfamiliar and impersonal. As a result, users are frustrated because they need to complete a variety of mundane configuration tasks before the device feels familiar and personalized.

SUMMARY

Schematized data roaming is described herein. In one or more implementations, a cloud service includes a cloud data store that is configured to store schematized data comprising user preferences and settings of client devices associated with a user profile. The schematized data includes a schema that is shared across the client devices and globally defined by the cloud service which enables the user preferences and setting to be re-used across multiple devices and device classes, including devices that the user has not previously interacted with before. The schematized data can also be consumed via various cloud services and applications. The cloud service enables the schematized data to be roamed or replicated across multiple device, but can also be used by devices and services for other purposes, such as data mining to power automated personal assistance (e.g., bots), configuration for cloud applications, and so forth.

The schematized data includes a schema definition which defines various attributes (e.g., rules) for processing or storing the schematized data in the cloud data store. Such attributes may include a conflict resolution policy that defines rules for resolving conflicts between different copies of a schematized data structure, an upload policy that defines rules for uploading the schematized data from the client devices to the cloud service, or a partition policy that defines whether changes to the schematized data are to be applied across all client devices or to a subset of the client devices.

The cloud service also includes a schematized data manager configured to detect changes made to schematized data by one or more of the client devices associated with the user profile, process and store the changes to the schematized data in the cloud data store in accordance with the attributes associated with the schematized data structure, and make the schematized data stored in the cloud data store accessible to the other client devices associated with the user profile.

A conflict resolution module implemented at the cloud service and/or one or more client devices, is configured to automatically resolve conflicts between copies of the schematized data received from different client devices by applying the conflict resolution policy to the schematized data in order to resolve the conflicts. In one or more implementations, the schematized data is accessible through a cloud manager at the client devices that implements an application programming interface to the cloud data store. In some cases, a direct cloud (REST) API is provided for client devices that do not need a local cache. The REST API provides server-side conflict resolution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
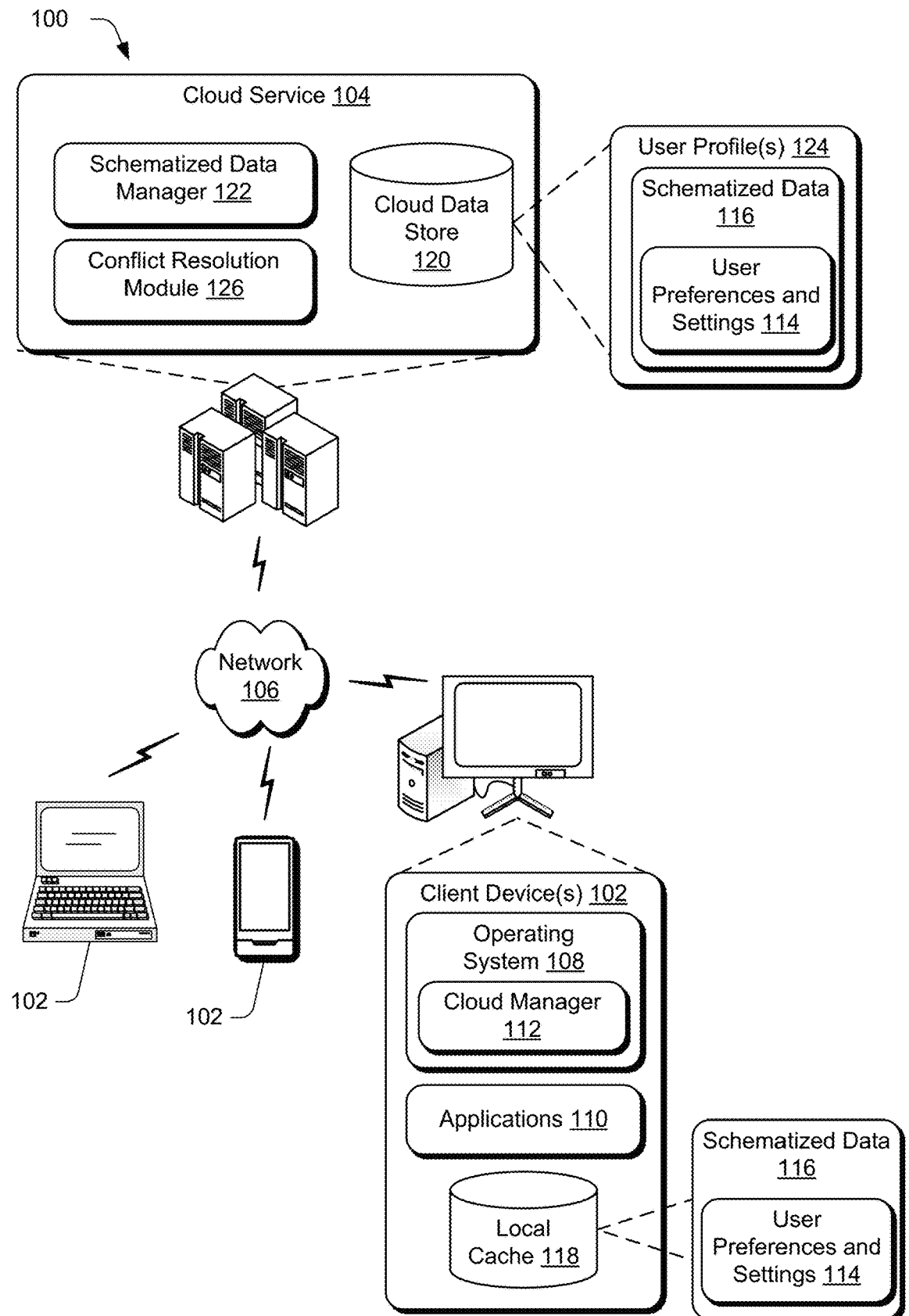
FIG. 1 is an illustration of an example operating environment that is operable to employ techniques described herein.

Schematized data roaming is described herein. In one or more implementations, a cloud service includes a cloud data store that is configured to store schematized data comprising user preferences and settings of client devices associated with a user profile. The schematized data includes a schema that is shared across the client devices and globally defined by the cloud service which enables the user preferences and setting to be re-used across multiple devices and device classes, including devices that the user has not previously interacted with before. The schematized data can also be consumed via various cloud services and applications. The schematized data includes a schema definition which defines various attributes (e.g., rules) for processing or storing the schematized data in the cloud data store. Such attributes may include a conflict resolution policy that defines rules for resolving conflicts between different copies of a schematized data structure, an upload policy that defines rules for uploading the schematized data from the client devices to the cloud service, or a partition policy that defines whether changes to the schematized data are to be applied across all client devices or to a subset of the client devices.

The cloud service also includes a schematized data manager configured to detect changes made to schematized data by one or more of the client devices associated with the user profile, process and store the changes to the schematized data in the cloud data store in accordance with the attributes associated with the schematized data structure, and make the schematized data stored in the cloud data store accessible to the other client devices associated with the user profile.

A conflict resolution module implemented at the cloud service and/or one or more client devices, is configured to automatically resolve conflicts between copies of the schematized data received from different client devices by applying the conflict resolution policy to the schematized data in order to resolve the conflicts. In this way, the described techniques enable a data driven conflict resolution approach in which conflicts are resolved based on rules defined in the data itself, without the need for separate code or rules to resolve the conflicts.

In one or more implementations, the schematized data is accessible through a cloud manager at the client devices that implements an application programming interface to the cloud data store. Thus, the schematized data can be leveraged across devices and extended to new scenarios and devices that did not exist when the schematized data was initially stored. In this way, instantly personalized experiences may be created. For example, when a user signs in to a new device, the device may instantly be personalized with user preferences and settings data, even if the device is a new device that the user has not previously used. As a result, a user's experience can be personalized and tailored to them on all devices without prior knowledge of that device.

Example Environment

FIG. 1 is an illustration of an environment 100 in an example implementation that is operable to employ techniques described herein. The illustrated environment 100 includes multiple client devices 102 and a cloud service 104 that are communicatively coupled via a network 106. The client devices 102 and cloud service 104 may be implemented by one or more computing devices and also may be representative of one or more entities.

A computing device may be configured in a variety of ways. For example, a computing device may be configured as a computer that is capable of communicating over the network 106, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers utilized by a business to perform operations, and so on. Further examples of computing systems and devices suitable to implement techniques described herein are described below in relation to FIG. 9.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client devices 102 are further illustrated as including an operating system 108. The operating system 108 is configured to abstract underlying functionality of the underlying device to applications 110 that are executable on the client device 102. For example, the operating system 108 may abstract processing, memory, network, and/or display functionality such that the applications 110 may be written without knowing "how" this underlying functionality is implemented. The application 110, for instance, may provide data to the operating system 108 to be rendered and displayed by a display device as illustrated without understanding how this rendering will be performed. A variety of applications 110 typically associated with client devices are contemplated including, but not limited to, a productivity suite that integrates multiple office productivity modules, a web browser, games, a multi-media player, a word processor, a spreadsheet program, a photo manager, and so forth.

The client device 102 is also illustrated as including a cloud manager 112. In this example, the cloud manager 112 is depicted as being implemented as a component of the operating system 108. Alternatively, the cloud manager 112 may be provided as a standalone application and/or as a component of another application 110. The cloud manager 112 represents client-side functionality which provides an application programming interface (API) that the operating system 108 and applications 110 can use to read and write schematized data 116, regarding the user preferences and settings 114, to the cloud service 104. The schematized data 116 is then made accessible from the cloud service 104 through the cloud manager 112, or directly from the cloud service 104 via a direct cloud REST API. The REST API is usable by client devices that do not need a local cache, and provides server-side conflict resolution.

The cloud manager 112 is also configured to store a subset of the schematized data 116 in a local cache 118 at client devices 102. The local cache 118 may be implemented as a sparse cache such that only data that has been requested by client device 102 is stored in the local cache 118. Further, the local cache 118 enables offline read/write access to the schematized data 116. For instance, the schematized data 116 can be stored in the local cache 118 when the client device 102 is offline, and then uploaded to the cloud service 104 when the client device 102 comes back online The operating system 108 is configured to provide the schematized data to the user seamlessly as if the data is stored in the file system or registry of the client device 102, such that the user is unaware whether the schematized data is received from the cloud service 104 or the local cache 118.

The cloud service 104 collects schematized data 116, from various client devices 102, and stores the schematized data in a cloud data store 120. A schematized data manager 122 is configured to generate a user profile 124 for each user, and to associate the schematized data 116 with the particular user profile 124. As discussed throughout, a user may be associated with a variety of different client devices 102, and thus the user profile 124 for a user includes schematized data 116 of user preferences and settings 114 associated with a variety of different client devices 102. As described herein, the user preferences and settings 114 may include any user preferences or settings related to applications, the operating system, a browser, WiFi settings, display settings, a user history, and any other type of information that is specific to the user regarding how the user interacts with a variety of different device classes.

The cloud data store 120 enables client devices 102 to store schematized data 116 in the cloud, and provides visibility into status, progress, changes, and conflicts. In one or more implementations, the cloud data store is built on a Bond system which provides a mechanism to define data structures, and includes a compiler that generates C++ structures, and a runtime that (de)serializes instances of those structures. As will be discussed in more detail below, the cloud data store 120 makes the schematized data 116 available to client devices 102 and services in a schematized, serialized, and uniform way.

Environment 100 further includes a conflict resolution module 126, which is depicted as being implemented at the cloud service 104. However, the conflict resolution module may also be implemented at client devices 102 in at least some implementations. The conflict resolution module 126 represents functionality to detect conflicts between different copies of schematized data 116, and automatically resolve these conflicts using attributes or rules defined by the schema of the schematized data 116.

Figure 2:
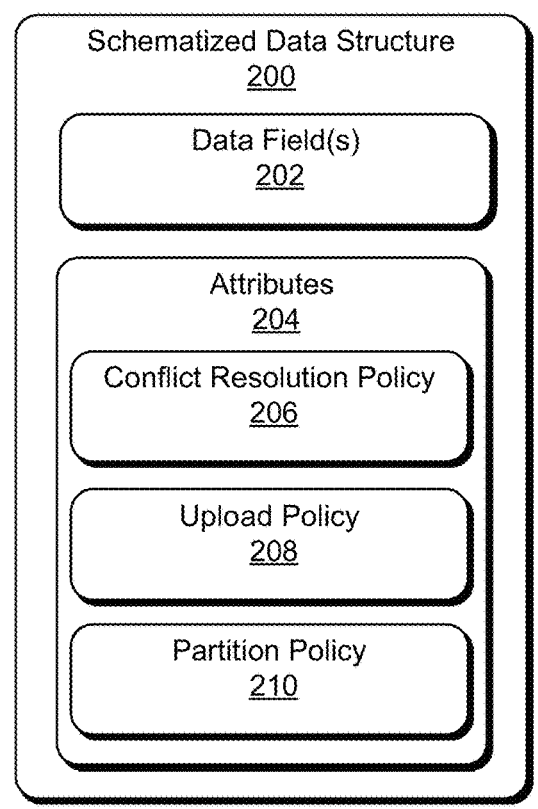
FIG. 2 depicts an example schematized data structure of schematized data in accordance with one or more implementations.

FIG. 2 depicts an example schematized data structure 200 of the schematized data 116 in accordance with one or more implementations. As discussed throughout, schematized data 116 includes a schema that is cloud-defined and shared globally, and thus is not confined to a single component, device, or service. The schematized data 116 is readable by any device and service, even new devices and services as they are brought online In this example, the schematized data structure 200 includes one or more data fields 202. As an example, a schematized data structure for accessibility settings may include two data fields 202, a first data field which includes a Boolean value which defines whether or not high contrast is enabled, and a second data field that includes a vector of strings which indicate all of the high contrast profiles that have been used in order of preference.

In addition, the schematized data structure 200 includes one or more attributes 204, which provide a definition or rules for the data structure which can be used by the schematized data manager 122 when storing or processing the schematized data 116. Thus, the attributes 204 enable "data driven" processing of the schematized data 116 because the rules for processing the data are contained within the schematized data structure itself. As such, separate code or rules are not required in order to process and store the schematized data structure 200.

The attributes 204 include, by way of example and not limitation, a conflict resolution policy 206, an upload policy 208, and a partition policy 210. The conflict resolution policy 206 defines rules for resolving conflicts between different copies of the schematized data 116, such as a first copy of a schematized data structure that is uploaded from a user's desktop computer and a second copy of the schematized data structure that is uploaded from the user's smartphone. The rules of the conflict resolution policy 206 can be applied recursively to multiple levels of the data structure by the conflict resolution module 126. This "data driven" approach enables resolution of conflicts by the conflict resolution module 126 without using separate conflict resolution code. Instead, conflict resolution module 126 simply processes the schematized data by applying the associated conflict resolution policy 206 to the schematized data 116. Additionally, the conflict resolution policy 206 enables different schematized data structures to be processed differently.

Various different types of conflict resolution policies 206 are contemplated, including, by way of example and not limitation, a "last write wins" policy, a "merge" policy, a "summation" policy, or any combination of these policies. The last write wins policy resolves data conflicts by storing the copy of the schematized data structure with the most recent write time in cloud data store 120. The merge policy defines ways in which conflicting copies of schematized data 116 are "merged", such that certain data fields 202 of the schematized data 116 are updated using a first copy of the schematized data and other data fields 202 are updated using a different copy of the schematized data.

The upload policy 208 defines rules for uploading the schematized data 116 from the client devices 102 to the cloud service 104. For example, the upload policy 208 may define how frequently the schematized data 116 is uploaded to the cloud data store 120 from the various client devices 102. In some cases, the upload policy 208 may be configured to reduce the load on servers by throttling how frequently that schematized data 116 is uploaded to the cloud data store 120. For example, if the upload policy 208 is set to "immediate", then the schematized data 116 is uploaded to the cloud data store 120 immediately each time that the data is changed on a client device 102. As another example, if the upload policy 208 is set to "opportunistic", then the schematized data 116 can be uploaded to the cloud data store 120 whenever other activities are also occurring in the background. Alternately, in some cases upload times can be defined by the upload policy 208, such that the schematized data 116 is uploaded at set times, such as every hour, every 24 hours, and so forth. Notably, the cloud manager 112 determines when to upload different types of schematized data 116 based on the upload policy 208, which may be defined differently for different data types.

The partition policy 210 defines whether changes to the schematized data 116 are to be applied across all client devices or to a subset of client devices. For example, the partition policy 210 enables the schematized data 116 to be stored on a "per user" basis, a "per device class" basis, or a "per experience" basis. Partitioning the schematized data 116 on a per user basis enables the client devices 102 of a user to be seamlessly configured with the same user preferences and settings across all devices. In this scenario, changes that the user makes on one device (e.g., the user's laptop) will automatically be applied to user preferences and settings on other devices (e.g., the user's smartphone) regardless of the class type of the device. However, if the partition policy 210 is set to a particular device class, then the changes will only be applied to other client devices that are a part of the device class. Notably, therefore, by using attributes for the schematized data, individual types of data can be specified as to where to be applied, without having to globally customize the settings.

Figure 3:
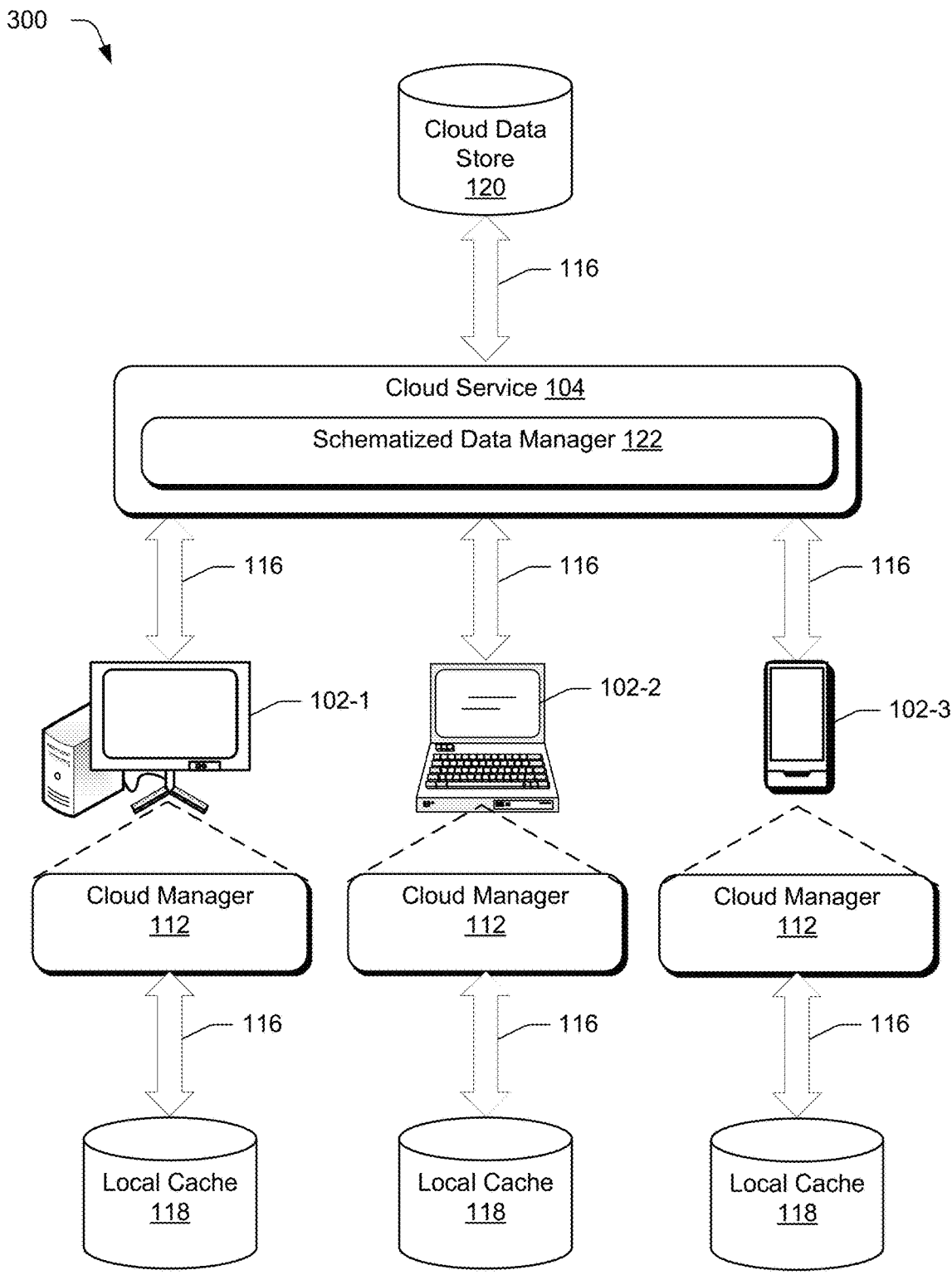
FIG. 3 illustrates an example in which a schematized data manager interacts with a local cache and a cloud manager.

FIG. 3 illustrates an example 300 in which a schematized data manager interacts with a local cache and a cloud manager.

In this example, cloud manager 112 is shown as being implemented at different client devices associated with a user, which in this case include a desktop computing device 102-1, a laptop computing device 102-2, and a smartphone 102-3. When the user makes a change to schematized data 116 on one of client devices 102-1, 102-2, or 102-3, the respective cloud manager 112 detects the change and stores the changed schematized data 116 in the respective local cache 118. Then, when the client device 102 is connected to network 106 (and as defined by the upload policy 208), the cloud manager 112 uploads a copy of the changed schematized data 116 (or just the changes made to the schematized data) to cloud service 104 via the network 106. Prior to uploading the schematized data, the client device 102 may also validate the schematized data 116 to ensure that the data matches the schema. Schematized data manager 122 receives the changed schematized data 116, and stores the changes in the user profile associated with the user in the cloud data store 120.

These changes may also be automatically applied to the other client devices 102 as well, based on the partition policy 210 of the schematized data 116, as discussed above. When the user logs in to a different client device (e.g., client device 102-2), the cloud manager 112 first determines whether the schematized data 116 stored the cloud data store 120 has changed. If there have been no changes, then the schematized data is read from the local cache 118 for the client device 102-2. Alternately, if changes are detected, the schematized data is downloaded from the cloud data store 120. In this way, the user can receive a consistent user experience across different client devices.

In some cases, conflicts may occur between data fields 202 of the schematized data 116. For example, the user may make changes to the schematized data 116 on one client device 102 which conflict with changes made to the schematized data 116 on a different client device 102. Conflict resolution module 126 is configured to automatically resolve conflicts between copies of the schematized data 116 using the attributes 204 of the schematized data 116. In this way, the described techniques enable a data driven conflict resolution approach in which conflicts are resolved based on rules defined in the data itself, without the need for separate code or rules to resolve the conflicts.

Figure 4:
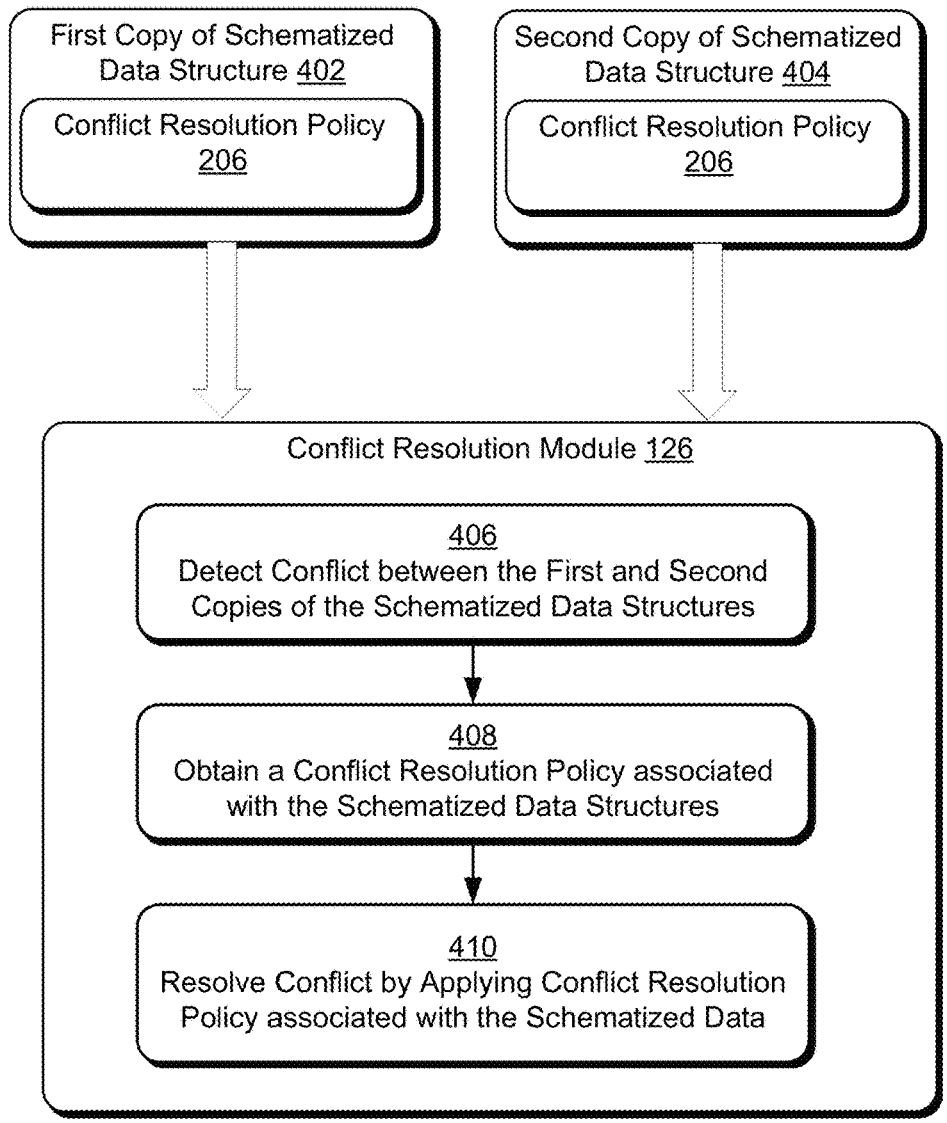
FIG. 4 depicts a diagram showing an example scenario for implementing conflict resolution for schematized data.

Consider, for example, FIG. 4 which depicts a diagram showing an example scenario for implementing conflict resolution for schematized data, generally at 400. In particular, FIG. 4 represents operations that may be performed by conflict resolution module 126 in order to resolve a conflicts between different copies of schematized data 116.

In this example scenario, at 402, conflict resolution module 126 compares a first copy of a schematized data structure 402 to a second copy of the schematized data structure 404. For example, if the schematized data 116 is already stored in cloud data store 120, then conflict resolution module 126 determines whether there is a conflict between the updated schematized data structure and the currently stored schematized data structure. Similarly, if more than one copy of updated data is received at substantially the same time (e.g., from different client devices 102), the conflict resolution module 126 may determine if there is a conflict between the updated schematized data structures. For example, in some cases, the user may make changes to the schematized data 116 for a first device that is offline. Then, the user may make changes to the schematized data 116 for a second device that is online When the first device comes online at a later time, a conflict may occur between the data changed on the first device and the data changed on the second device.

At 406, the conflict resolution module 126 detects a conflict between the first and second copies of the schematized data structures. Generally, a "conflict" occurs when the different copies of the schematized data structures include at least one data field 202 with different values. As discussed throughout, the schematized data 116 is annotated with attributes 204 which include conflict resolution policy 206. Thus, in response to detecting a conflict, at 408 the conflict resolution module 126 obtains the conflict resolution policy 206 associated with the schematized data structures.

Next, at 410, the conflict resolution module 126 applies the conflict resolution policy 206 to resolve the conflict automatically and without any user intervention. Conflict resolution module 126 applies the conflict resolution policy 206 recursively, by looking over the schematized data structures and applying the conflict resolution policy 206 to each data field 202. For example, each time a conflict is detected for a data field 202, the conflict resolution module 126 applies a conflict resolution policy 206 that is associated with the schematized data structure, such as "last write wins" or "merge", to resolve the conflict. If the conflict resolution policy 206 is last write wins, the conflict resolution module 126 selects the latest written value for each data field 202 (e.g., the most recently changed value). Alternately, if the conflict resolution policy 206 is "merge", the conflict resolution module 126 compares each copy of the schematized data structure with an "original" copy of the schematized data structure to see which copy includes a changed data field. If the data field has only been changed by one of the two client devices 102, then the conflict resolution module 126 updates the schematized data structure with the changed value. If, however, the data field has been changed by both of the client devices 102, then the conflict resolution module 126 applies a different conflict resolution policy to resolve the conflict, such as "last write wins". After the conflict between the copies of the schematized data structures is resolved, conflict resolution module 126 stores the schematized data structure, with the conflicts resolved, in the cloud data store 120.

Figure 5:
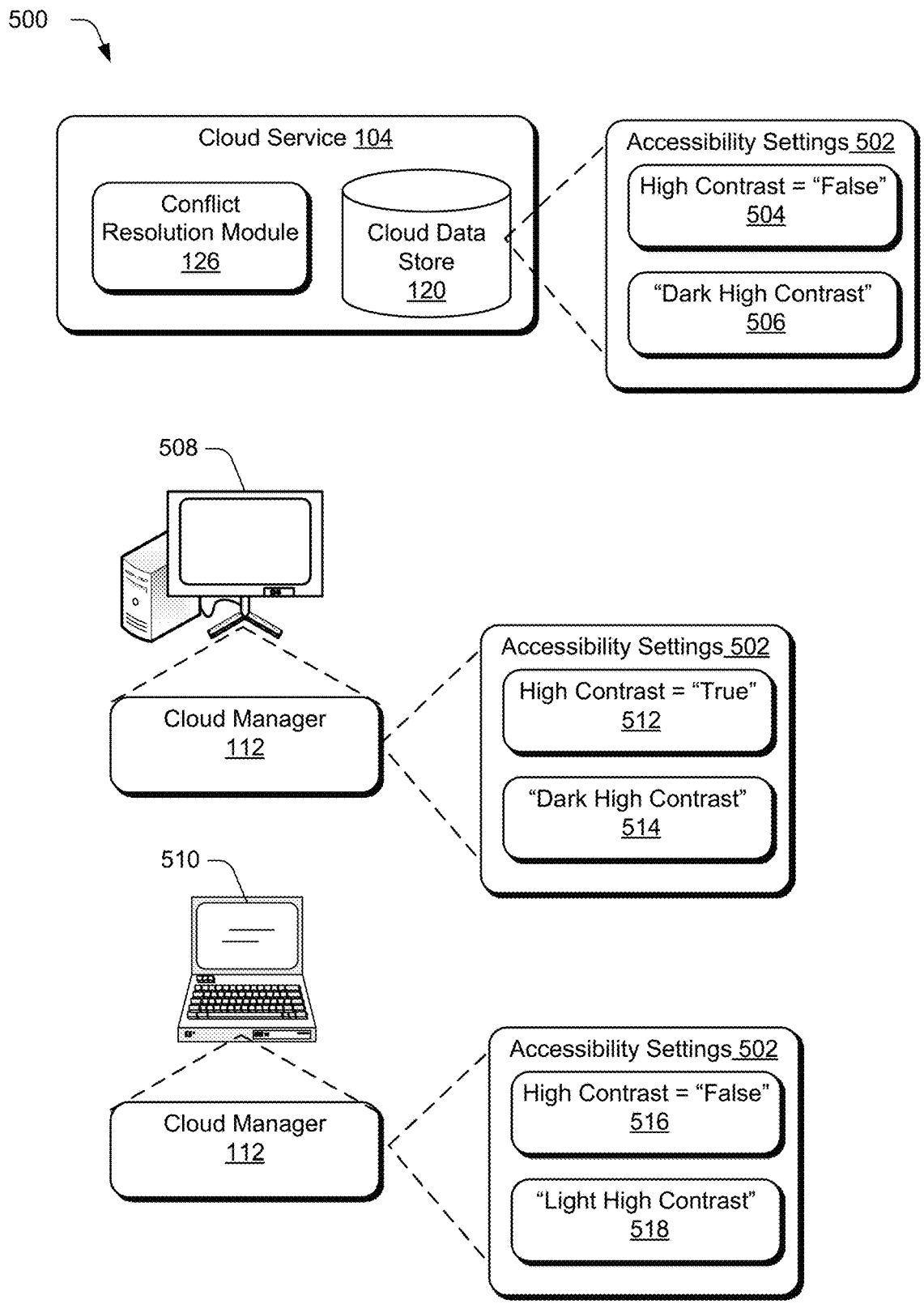
FIG. 5 illustrates an example scenario of resolving a conflict for different copies of a schematized data structure.

As an example of conflict resolution for schematized data, consider FIG. 5 which illustrates an example scenario 500 of resolving a conflict for different copies of a schematized data structure.

In this example, a data schema for accessibility settings is shown, which includes two data fields. A first data field includes a Boolean value that indicates whether or not high contrast is being utilized, and a second data field includes a vector of strings which indicates the high contrast profile. This schema is specified in the cloud, such that the cloud service 104 knows about the accessibility data structure within these two data fields.

In this example, current accessibility settings 502 are stored in the cloud data store 120 in which the high contrast data field set to "false" (e.g., high contrast is "off") at 504, and the high contrast profile set to "dark high contrast" at 506.

The user, in this example, utilizes two client devices, a first client device 508 (depicted as a desktop computer) and a second client device 510 (depicted as a laptop computer). Consider, in this example, that both first and second client devices are offline, such that they are not connected to the cloud service 104.

Now, consider that the user first makes changes to the accessibility settings on first client device 508 by changing the high contrast boolean value to "true" at 512. The user does not change the high contrast profile, however, and thus the high contrast profile remains set as "Dark High Contrast" at 514.

Next, the user makes changes to the accessibility setting on second client device 510. The user does not change the Boolean value at 516 (and thus the Boolean value is the same as the cloud value), but the user does change the contrast profile to "light high contrast" at 518. Notably, therefore, the user now has accessibility settings on two different client devices that have two values that are not the same based on these changes.

Now, consider that the second client device comes back online, and the accessibility settings are uploaded to the cloud service 104. The schematized data manager 122 receives the changed accessibility settings, and changes the contrast profile to "light", but does not change the high contrast Boolean value from false. There is no conflict here, because the conflict resolution module 126 assumes that changes made to the accessibility settings on one client device are intended to be saved to the cloud data store 120.

However, when the first client device 508 comes online, and the schematized data is uploaded, a conflict occurs because the accessibility settings of the first client device are different than the accessibility settings of the second client device 510, which are now saved in the cloud data store 120. In order to resolve the conflict, conflict resolution module 126 obtains the conflict resolution policy 206 associated with the data schema for the accessibility settings and applies the conflict resolution policy to the conflict. The way in which the conflicts are resolved, therefore, is driven by the attributes 204 of the schematized data structure.

Consider, for example, that if the conflict resolution policy 206 is last write wins, then the conflict resolution module 126 will store the accessibility settings of the second client device 510 in the cloud data store 120 because this data has the most recent write time. Alternately, if the conflict resolution policy is "merge", then the conflict resolution module merges the changes made by the first client device 508 and the second client device 510. In this case, the conflict resolution module 126 sets the high contrast value to "true" because the first client device 508 changed this value, but the second client device 510 did not. Similarly, the conflict resolution module 126 sets the high contrast profile to "light high contrast" because the second client device 510 changed this value, but the first client device 508 did not. As such, the accessibility settings that are stored in the cloud data store 120 correspond to a "merged" copy of both the changes made to the accessibility settings by the first client device 508 and the changes made to the accessibility settings by the second client device 510.

Example Procedures

The following discussion describes schematized data roaming techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment, scenarios, and user interfaces discussed in relation to FIGS. 1 to 5. In at least some embodiments, the procedures may be performed by a suitably configured computing device, such as a client device 102 or a cloud service 104.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 6:
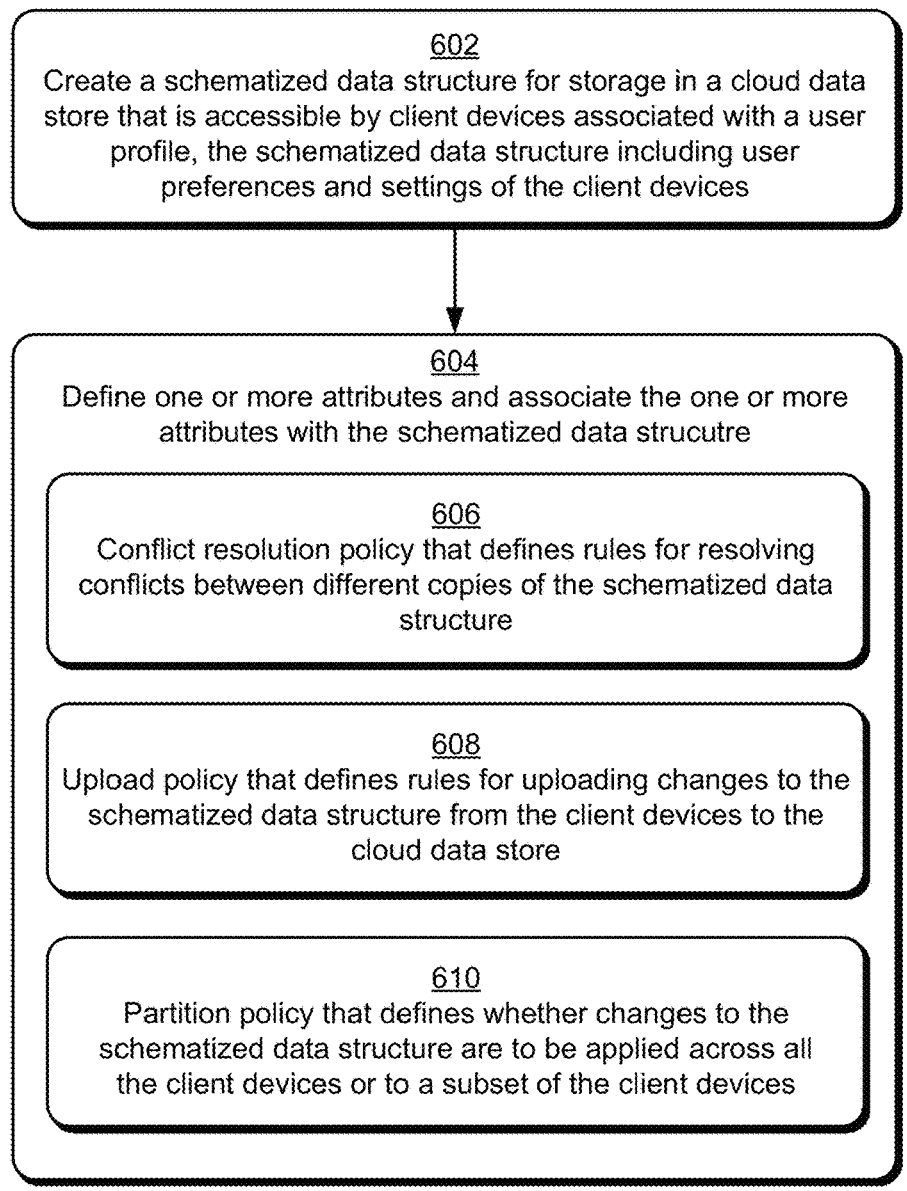
FIG. 6 is a flow diagram depicting an example procedure to create a schematized data structure in accordance with one or more implementations.

FIG. 6 is a flow diagram depicting an example procedure 600 to create a schematized data structure in accordance with one or more implementations. At 602, a schematized data structure for storage in a cloud data store that is accessible by client devices associated with a user profile is created. The schematized data structure includes user preferences and settings of the client devices. For example, a schematized data structure 200 can be created for storage in a cloud data store 120 that is accessible by client devices 102 associated with a user profile 124. The schematized data structure 200 may include user preferences and settings 114 of client devices 102.

At 604, one or more attributes are defined and associated with the schematized data structure. For example, attributes 204 can be defined and associated with the schematized data structure 200.

A variety of different attributes are contemplated. For example, at 606, the attributes include a conflict resolution policy that defines rules for resolving a conflict between different copies of the schematized data structure. Alternately or additionally, at 608, the attributes include an upload policy that defines rules for uploading changes to the schematized data structure from the client devices to the cloud data store. Alternately or additionally, at 610, the attributes include a partition policy that defines whether changes to the schematized data structure are to be applied across all the client devices or to a subset of the client devices.

Figure 7:
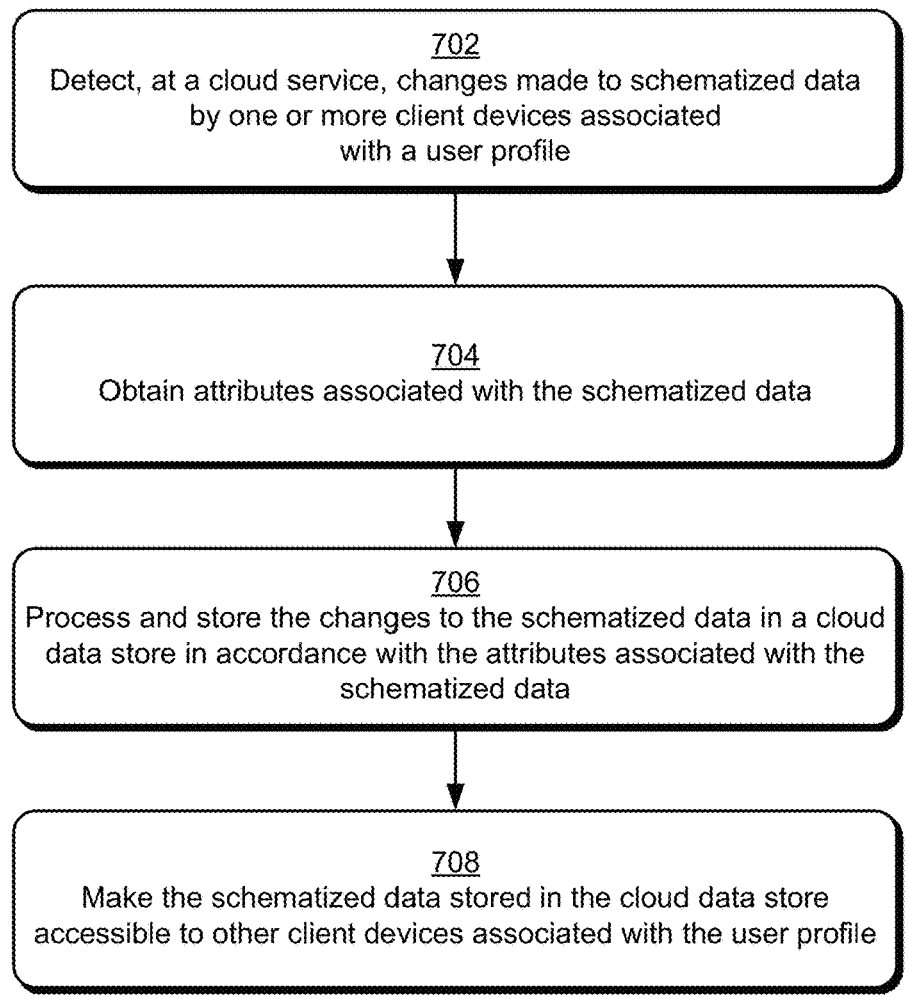
FIG. 7 is a flow diagram depicting an example procedure for managing access to schematized data stored in a cloud data store in accordance with one or more implementations.

FIG. 7 is a flow diagram depicting an example procedure 700 for managing access to schematized data stored in a cloud data store in accordance with one or more implementations. At 702, changes made to schematized data by one or more client devices associated with a user profile is detected at a cloud service. For example, a schematized data manager 122 implemented at a cloud service 104 detects changes made to schematized data 116 by one or more client devices 101 associated with a user profile 124. The schematized data 116 may correspond to user preferences and settings 114 of the client devices 102.

At 704, attributes associated with the schematized data are obtained. For example, schematized data manager 122 obtains attributes 204 associated with the schematized data 116, which may include one or more of a conflict resolution policy 206, an upload policy 208, or a partition policy 210.

At 706, the changes to the schematized data is processed and stored in a cloud data store in accordance with the attributes associated with the schematized data. For example, schematized data manager 122 processes and stores the changes made to the schematized data 116 in cloud data store 120. In some cases, schematized data manager 122 leverages conflict resolution module 126 to resolve conflict between different copies of the schematized data 116.

At 708, the schematized data stored in the cloud data store is made accessible to other client devices associated with the user profile. For example, schematized data manager 122 makes the schematized data 116, stored in the cloud data store 120, accessible to other client devices 102 associated with the user profile 124. In some cases, the client devices 102 implement a schematized data manager 122 which provides an API to access the schematized data 116 from the cloud data store 120.

Figure 8:
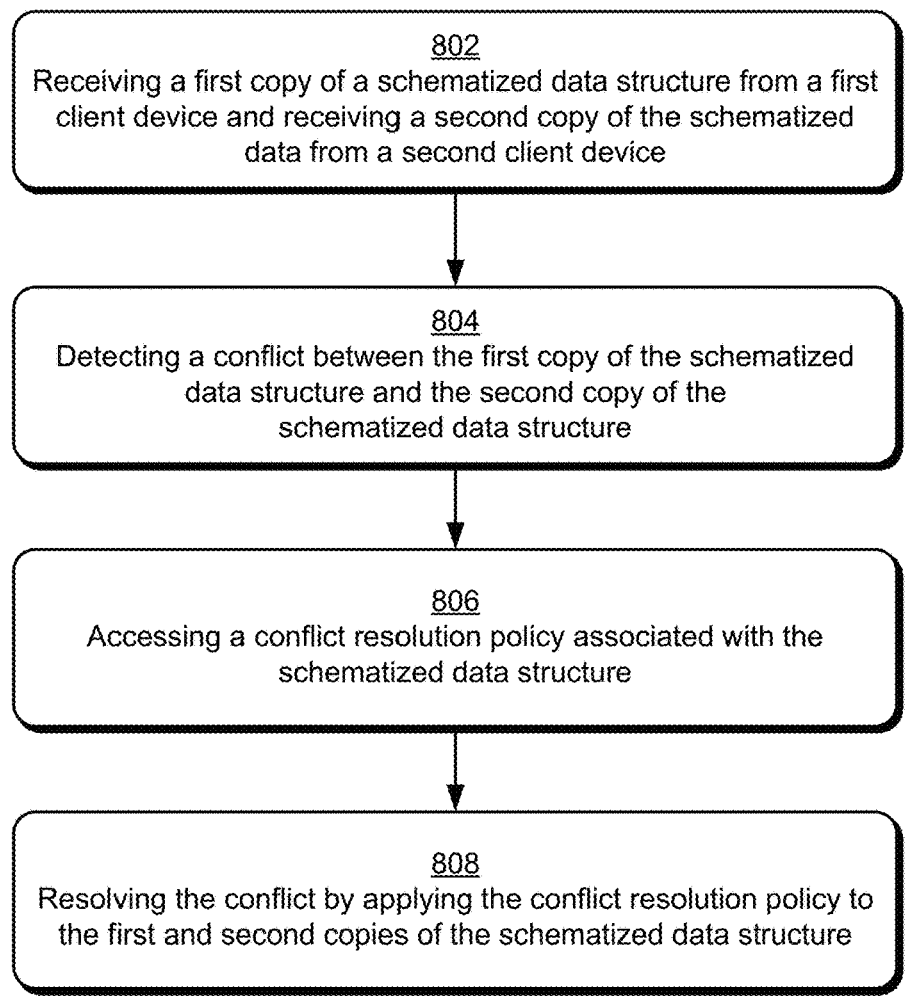
FIG. 8 is a flow diagram depicting an example procedure for resolving a conflict between different copies of schematized data in accordance with one or more implementations.

FIG. 8 is a flow diagram depicting an example procedure 800 for resolving a conflict between different copies of schematized data. At 802, a first copy of a schematized data structure is received from a first client device and a second copy of the schematized data structure is received from a second client device. For example, cloud service 104 receives a first copy of a schematized data structure 402 from a first client device 102 and a second copy of the schematized data structure 404 from a second client device 102.

At 804, a conflict is detected between the first copy of the schematized data structure and the second copy of the schematized data structure. For example, conflict resolution module 126 detects a conflict between the different copies of the data structure.

At 806, a conflict resolution policy associated with the schematized data structure is obtained. For example, conflict resolution module 126 obtains a conflict resolution policy 206 associated with the schematized data structure. The conflict resolution policy 206 may include, by way of example and not limitation, a last write wins policy or a merge policy.

At 808, the conflict is resolved by applying the conflict resolution policy to the first and second copies of the schematized data structure. For example, conflict resolution module 126 applies the conflict resolution policy 206 to resolve the conflict.

Having considered some example procedures, consider now a discussion of an example system and components of the system that can be employed to implement embodiments of the techniques for schematized data roaming described herein.

Example System and Device

Figure 9:
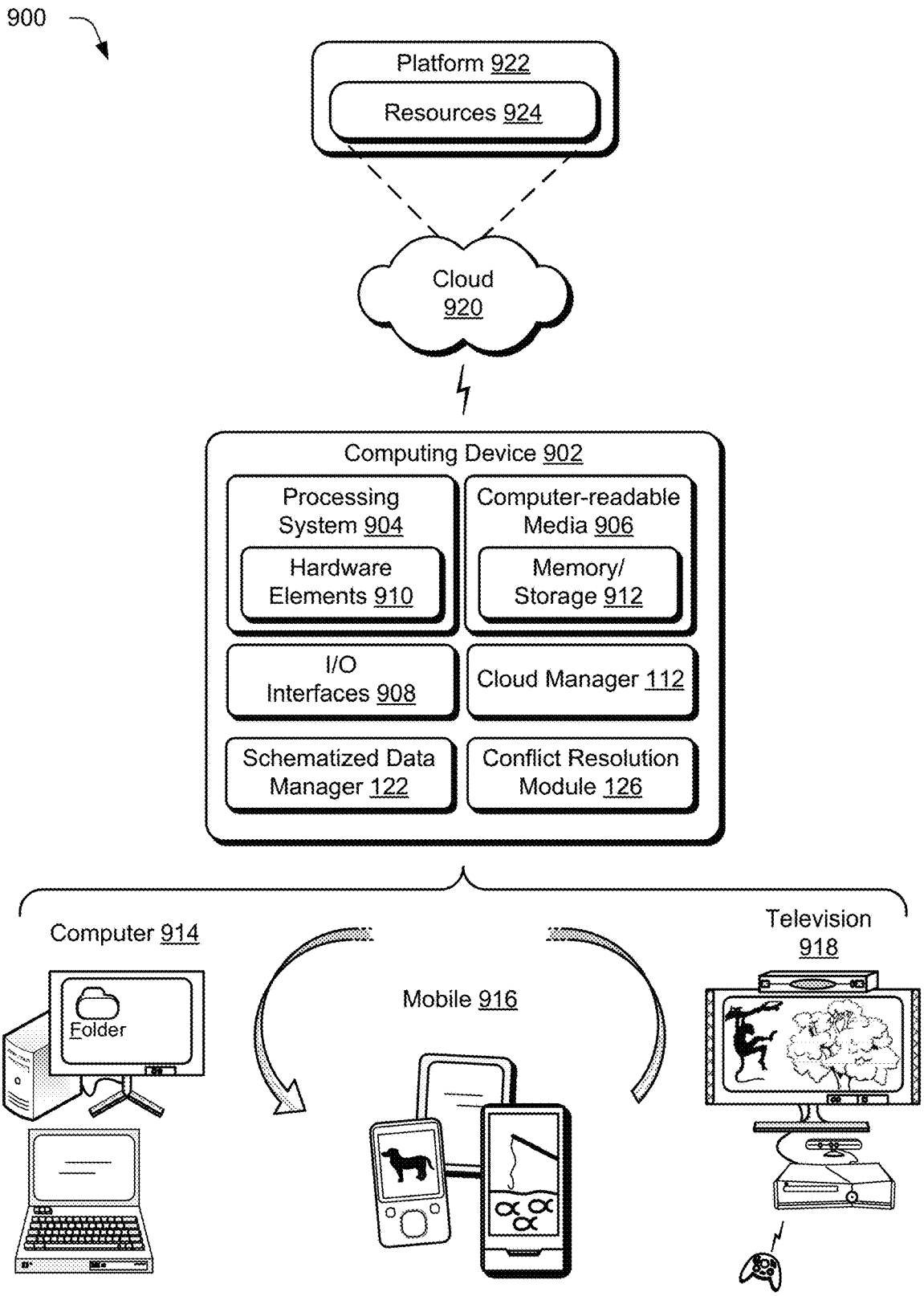
FIG. 9 illustrates an example system that includes an example computing device that is representative of one or more computing systems and/or devices that may implement the various techniques described herein.

FIG. 9 illustrates an example system generally at 1000 that includes an example computing device 902 that is representative of one or more computing systems and/or devices that may implement the various techniques described herein. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 902, such as via a network. Communication media typically may embody computer readable instructions, data structures, program modules, or other data in a modulated data signal, such as carrier waves, data signals, or other transport mechanism. Signal media also include any information delivery media.

The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 110, cloud manager 112, schematized data manager 122, conflict resolution module 126, and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the schematized data manager 122 and the cloud manager 112 on the computing device 902. The functionality of the cloud content manager and other modules may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Conclusion and Example Implementations

Example implementations described herein include, but are not limited to, one or any combinations of one or more of the following examples:

In one or more examples, a system comprises: one or more servers to implement a cloud service, the cloud service comprising: a cloud data store configured to store schematized data comprising user preferences and settings of client devices associated with a user profile, the schematized data including attributes, for each schematized data structure, which provide rules for processing or storing the corresponding schematized data structure in the cloud data store;

and a schematized data manager configured to: detect changes made to a schematized data structure by one or more of the client devices associated with the user profile; process and store the changes to the schematized data structure in the cloud data store in accordance with the attributes associated with the schematized data structure; and make the schematized data stored in the cloud data store accessible to the other client devices associated with the user profile.

An example as described alone or in combination with any of the other examples described above or below, wherein the schematized data includes a schema that is shared across the client devices and globally defined by the cloud service.

An example as described alone or in combination with any of the other examples described above or below, wherein the attributes include a conflict resolution policy that defines rules for resolving conflicts between different copies of the schematized data structure.

An example as described alone or in combination with any of the other examples described above or below, wherein the cloud service further comprises a conflict resolution module configured to resolve conflicts between different copies of the schematized data structure received from different client devices by applying the conflict resolution policy associated with the schematized data structure.

An example as described alone or in combination with any of the other examples described above or below, wherein the conflict resolution module resolves the conflict without using separate conflict resolution code.

An example as described alone or in combination with any of the other examples described above or below, wherein the conflict resolution policy comprises a last write wins policy or a merge policy.

An example as described alone or in combination with any of the other examples described above or below, wherein the attributes includes an upload policy that defines rules for uploading changes to the schematized data from the client devices to the cloud service.

An example as described alone or in combination with any of the other examples described above or below, wherein the attributes includes a partition policy that defines whether changes to the schematized data are to be applied across all client devices or to a subset of the client devices.

An example as described alone or in combination with any of the other examples described above or below, wherein the schematized data is made accessible to the client devices via a cloud manager implemented at each client device, the cloud manager configured to implement an application programming interface to the cloud data store.

An example as described alone or in combination with any of the other examples described above or below, wherein the schematized data is made accessible to the client devices directly from the cloud data store via REST APIs.

An example as described alone or in combination with any of the other examples described above or below, wherein a subset of the schematized data is stored at a local cache implemented at each client device, the local cache configured to enable offline read and write access to the schematized data.

An example as described alone or in combination with any of the other examples described above or below, wherein data types of the schematized data are defined using a BOND framework.

An example as described alone or in combination with any of the other examples described above or below, wherein the schematized data stored in the cloud data store enables new client devices to be instantly personalized with the user settings and preferences.

In one or more examples, one or more computer-readable storage media comprises instructions that, when executed by one or more processors, implement a conflict resolution module configured to perform operations comprising: receiving a first copy of a schematized data structure from a first client device and receiving a second copy of the schematized data structure from a second client device; detecting a conflict between the first copy of the schematized data structure and the second copy of the schematized data structure; accessing a conflict resolution policy associated with the schematized data structure; and resolving the conflict by applying the conflict resolution policy to the first and second copies of the schematized data structure.

An example as described alone or in combination with any of the other examples described above or below, wherein the conflict resolution policy comprises a first write wins policy.

An example as described alone or in combination with any of the other examples described above or below, wherein the conflict resolution policy comprises a merge policy.

An example as described alone or in combination with any of the other examples described above or below, wherein the conflict resolution policy is embedded with the schematized data structure.

An example as described alone or in combination with any of the other examples described above or below, wherein the conflict resolution policy is stored at a cloud service.

In one or more example, a method implemented by a computing device comprises: creating a schematized data structure for storage in cloud data store that is accessible by client devices associated with a user profile, the schematized data structure comprising user preferences and settings of the client devices; defining one or more attributes and associating the one or more attributes with the schematized data structure, the one or more attributes comprising one or more of: a conflict resolution policy that defines rules for resolving conflicts between different copies of the schematized data structure; an upload policy that defines rules for uploading changes to the schematized data structure from the client devices to the cloud data store; and a partition policy that defines whether changes to the schematized data structure are to be applied across all the client devices or to a subset of the client devices.

An example as described alone or in combination with any of the other examples described above or below, wherein the attributes enable processing and storage of the schematized data structure in the cloud data store.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A system comprising:
   one or more servers of a cloud service that are configured to implement a schematized data manager, wherein the schematized data manager is configured to:
   detect changes made to a schematized data structure by a client device that is associated with a user profile of the cloud service;

process and store the changes to the schematized data structure in a cloud data store in accordance with attributes associated with the schematized data structure;

apply a partition policy that uses partition application rules associated with the user profile to determine whether the changes to the schematized data structure are to be automatically applied to other client devices associated with the user profile, wherein an application of the partition policy:

evaluates the partition application rules which define how the changes to the schematized data structure are to be applied across the other client devices, and determines whether the changes to the schematized data structure are to be automatically applied across all of the other client devices associated with the user profile or to a subset of the other client devices based on a result of an evaluation of the partitional application rules associated with the user profile; and automatically apply, from the cloud data store to one or more of the other client devices, the changes to the schematized data structure based on the result of the application of the partition policy.

2. The system of claim 1, wherein the one or more servers of the cloud service are further configured to implement a conflict resolution module that resolves a conflict between different copies of the schematized data structure received from different client devices by applying a conflict resolution policy associated with the schematized data structure.

3. The system of claim 2, wherein the conflict resolution policy comprises a last write wins policy or a merge policy.

4. The system of claim 1, wherein the schematized data structure is made accessible to client devices via a cloud manager implemented at each client device, the cloud manager configured to implement an application programming interface that interfaces with the one or more servers.

5. The system of claim 1, wherein the schematized data structure is made accessible to client devices directly from the cloud data store via one or more application programming interfaces.

6. The system of claim 1, wherein a subset of the schematized data structure is stored at a local cache implemented at a client device, the local cache configured to enable offline read and write access to the schematized data structure, and wherein the schematized data structure is uploaded to the cloud service when a user logs into the user profile using a network connection.

7. The system of claim 1, wherein data types of the schematized data structure are defined using a BOND framework.

8. The system of claim 1, wherein the schematized data structure stored in the cloud data store enables new client devices to be instantly personalized with the user settings and preferences of the user profile.

9. The system of claim 1, wherein the schematized data manager is configured to: detect a login to the cloud service by one of the other client devices associated with the user profile, and wherein the changes to the schematized data structure are automatically applied to the one of the other client devices based on a detection of the login to the cloud service and the result of the application of the partition policy.

10. A computer-implemented method executed on a computing device associated with a cloud service, the computer-implemented method comprising:

detecting changes made to schematized data structure by a client device that is associated with a user profile of the cloud service;

applying a partition policy that uses partition application rules associated with the user profile to determine whether the changes to the schematized data structure are to be automatically applied to other client devices associated with the user profile, wherein the applying of the partition policy comprises:

evaluating the partition application rules which define how the changes to the schematized data structure are to be applied across the other client devices, and determining whether the changes to the schematized data structure are to be automatically applied across all of the other client devices associated with the user profile or to a subset of the other client devices based on a result of an evaluation of the partitional application rules associated with the user profile; and automatically applying, to one or more of the other client devices, the changes to the schematized data structure based on the result of the applying of the partition policy.

11. The computer-implemented method of claim 10, further comprising: detecting a login to the cloud service by one of the other client devices associated with the user profile, and wherein the changes to the schematized data structure are automatically applied to the one of the other client devices based on the detecting of the login to the cloud service and the result of the applying of the partition policy.

12. The computer-implemented method of claim 10, further comprising: applying a conflict resolution policy associated with the schematized data structure to resolve a conflict between different copies of the schematized data structure, and wherein the automatically applying selects a copy of the schematized data structure to apply to the one of the other client devices based on a result of the applying of the conflict resolution policy.

13. The computer-implemented method of claim 10, wherein the schematized data structure is made accessible to client devices via a cloud manager implemented at each client device, the cloud manager configured to implement an application programming interface that interfaces with the cloud service.

14. The computer-implemented method of claim 10, wherein the schematized data structure is made accessible to client devices directly from a cloud data store of the cloud service via an application programming interface.

15. The computer-implemented method of claim 10, further comprising: storing the changes to the schematized data structure in a cloud data store of the cloud service, and wherein the automatically applying reads the changes to the schematized data structure from the cloud data store.

16. A computer-implemented method executed on a computing device interfacing with a cloud service, the computer-implemented method comprising:

detecting changes made to schematized data by a client device that is associated with a user profile of the cloud service;

storing the changes to the schematized data in a cloud data store of the cloud service;

applying a partition policy that uses partition application rules associated with the user profile to determine whether the changes to the schematized data are to be automatically applied to other client devices associated with the user profile, wherein the applying of the partition policy comprises:

evaluating the partition application rules which define how the changes to the schematized data are to be applied across the other client devices, and determining whether the changes to the schematized data are to be automatically applied across all of the other client devices associated with the user profile or to a subset of the other client devices based on a result of an evaluation of the partitional application rules associated with the user profile; and automatically applying, from the cloud data store to one or more of the other client devices, the changes to the schematized data based on the result of the applying of the partition policy.

17. The computer-implemented method of claim 16, further comprising: detecting a login to the cloud service by one of the other client devices associated with the user profile, and wherein the changes to the schematized data are automatically applied to the one of the other client devices based on the detecting of the login to the cloud service and the result of the applying of the partition policy.

18. The computer-implemented method of claim 16, further comprising: applying a conflict resolution policy associated with the schematized data to resolve a conflict between different copies of the schematized data, and wherein the automatically applying selects a copy of the schematized data to apply to the one of the other client devices based on a result of the applying of the conflict resolution policy.

19. The computer-implemented method of claim 16, wherein the schematized data is made accessible to client devices via a cloud manager implemented at each client device, the cloud manager configured to implement an application programming interface that interfaces with the cloud service.

20. The computer-implemented method of claim 16, wherein the schematized data is made accessible to client devices directly from a cloud data store of the cloud service via an application programming interface.

* * * * *